Patented Sept. 30, 1952

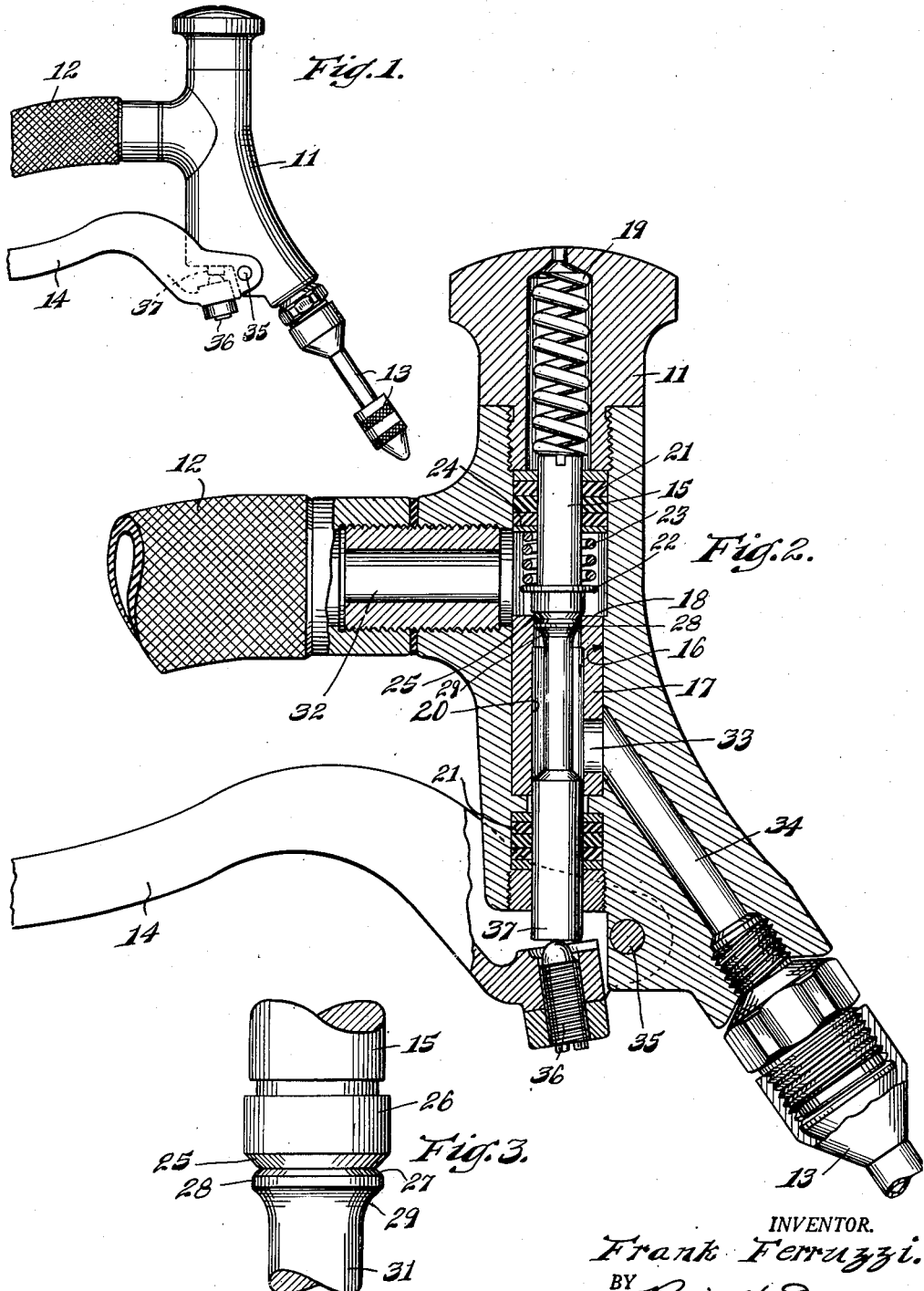

2,612,339

UNITED STATES PATENT OFFICE 2,612,339

VALVE CONSTRUCTION

Frank J. Ferruzzi, Willow Grove, Pa., assignor to The Aro Equipment Corporation, Bryan, Ohio, a corporation of Ohio Application March 13, 1947, Serial No. 734,328

3 Claims. (Cl. 251—28)

1

This invention relates to a valve construction and particularly to a valve construction for use in high pressure lubricant valves.

High pressure lubricant valves have heretofore been used in which a valve stem is provided which has a portion which seats on a stationary part of the valve casing. Such valve stems are generally cylindrical in shape and the seat portion has been provided with a flat or ground-off part through which the high pressure lubricant passed when the valve was in open position. It has been found, however, that the high pressure lubricant has a tendencey to burn the flat portion of the valve stem as it passes therethrough and eventually the valve would leak causing waste and untidiness and necessitating replacement of the valve stem.

It is an object of this invention to provide a valve stem for a high pressure lubricant valve which will remain tight throughout long periods but will permit passage of the required quantities of high pressure lubricant when in the open position.

It is another object of the invention to eliminate burning of valve stems in high pressure lubricant valves.

It is also an object of the invention to provide a valve stem having a novel shape to provide for ready passage of high pressure lubricant when the valve is open without burning of the valve stem.

It is also an object of the invention to provide a valve stem for a high pressure lubricant valve which is easily machined and which may be produced economically in large quantities.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Fig. 1 is an elevational view of a high pressure lubricant valve and nozzle to which my invention is particularly applicable.

Fig. 2 is a sectional view of the main portion of the lubricant valve shown in Fig. 1 with the nozzle and manually movable valve operating member broken off, and Fig. 3 is an enlarged view of a portion of the valve stem illustrating the shape of the valve stem adjacent the portion thereof which seats on a fixed part of the valve casing.

Referring specifically to the drawing for a detailed description of the invention, numeral 11

2 designates generally a housing for a high pressure lubricant valve which is attached to a source of high pressure lubricant (not shown) through a flexible hose 12. The valve is provided with a nozzle 13 which is adapted to be secured to a suitable grease fitting. A manual operating handle 14 is provided on the valve and secured to the valve casing 11 to raise and lower a valve stem, generally indicated at 15, which is disposed in a central vertical bore 16 in the valve housing 11. A sleeve 17 having an internal cylindrical bore 20 is pressed into the bore 16 adjacent the lower portion thereof and provides a seat 18 at its upper flat surface. The valve stem 15 is normally forced against the seat 18 by a coil spring 19 disposed in the upper portion of the bore 16. The valve stem extends through upper and lower packings 21 which prevent grease from escaping from the valve body 11.

The valve stem 15 is provided with a shoulder or flange 22 intermediate of the ends of the valve stem and a second coil spring 23 is positioned between the flange 22 and a packing ring 24 of the upper packing 21. This lighter spring 23 also tends to hold the valve on its seat 18 and provides a limiting device for the upward movement of the valve stem 15.

In accordance with the present invention the valve stem 15 has a tapered portion 25 which co-operates with the seat 18 to provide a fluid tight engagement when the valve stem 15 is in its closed position. Above the tapered portion 25 is a cylindrical portion 26. The tapered portion 25 is tapered inwardly and the valve stem then is provided with a tapered portion 27 which tapers outwardly. Below the tapered portion 27 there is provided a reduced cylindrical portion 28 which is relatively narrow in vertical extent. The cylindrical portion 28 is of such size that it engages the internal bore 20 of the sleeve 17 and when the valve is closed, as shown in Fig. 2, assists in preventing the passage of lubricant through the valve.

Below the cylindrical portion 28 the valve stem is provided with a fillet or radius indicated at 29 which fillet terminates in a reduced cylindrical portion 31 of the valve stem 15. The cylindrical portion 28 and the fillet 29 are so positioned that when the valve stem 15 is raised from its seat 18 the cylindrical portion 28 is disposed slightly above the valve seat 18 and high pressure lubricant from the hose 12 may flow through a horizontal passage 32 connecting the hose and the bore 16, thence through the bore 16 past the cylindrical portion 28 and the curved portion 29 of the valve stem, then through an opening 33 and the bottom of the sleeve 17 and out through a passage 34 in the lower portion of the valve casing 11 to the nozzle 13.

The handle or operating member 14 is pivoted at 35 on the housing 11 and is provided with screw-threaded adjustable engaging pin 36 which is positioned against a portion 37 of the valve stem 15 which extends exteriorly of the casing 11 adjacent the bottom thereof.

From the foregoing description it will be apparent that when the operator forces the handle 14 upwardly the pin 36 engages the extension 37 of the valve stem and forces the valve upwardly against the bias of the springs 19 and 23. The inwardly tapered portion of the valve stem 15 is, therefore, lifted from its seat 18 and the valve stem 15 is raised a sufficient distance so that the cylindrical portion 28 of the valve stem will be disposed above the seat 18. The high pressure lubricant may be forced through the passages described above from the hose 12 to the nozzle 13 and the high pressure lubricant will pass around all sides of the cylindrical portion 28 and curved portion 29 of the valve stem 15. By distributing the passage of the high pressure grease over a considerable area, burning of the valve stem is eliminated, the required amount of lubricant is permitted to pass through the valve and an effective seal is provided both by the engagement of the inwardly tapered portion 25 of the valve stem with the seat 18 and by the engagement of the cylindrical portion 28 of the valve stem 15 with the interior walls or bore 20 of the sleeve 17.

From the foregoing it will therefore be clear that I have provided an improved valve stem for high pressure lubricant valves which valve stem eliminates burning and the necessity of frequent replacement thereof.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. A valve for high pressure lubricant comprising a valve body, a passage for lubricant in the valve body and a seat formed therein, said seat dividing the lubricant passage into inlet and discharge sides, walls forming a bore within the valve body on the discharge side of said seat, a valve stem having at least a portion thereof within the valve body, said valve stem including a first portion adapted to engage with said seat to provide a fluid tight joint and to disengage from said seat to permit the passage of lubricant, a second portion of the valve stem adapted to slidably engage with the walls of said bore when the valve is in its closed position, and an inwardly and axially curved portion extending completely around the valve stem at the discharge side of the second portion thereof, said second portion at its discharge end providing an abrupt shoulder-like transition from said second portion to said inwardly and axially curved portion.

2. A valve for high pressure lubricant comprising a valve body, a passage for lubricant in the valve body and a seat formed therein, said seat dividing the lubricant passage into inlet and discharge sides, walls forming a bore within the valve body on the discharge side of said seat, a valve stem having a portion thereof within the valve body and an actuating portion extending from the discharge end of said valve body, said valve stem including a first portion adapted to engage with said seat to provide a fluid tight joint and to disengage from said seat to permit the passage of lubricant, a second portion of the valve stem adapted to slidably engage with the walls of said bore when the valve is in its closed position and an inwardly curved portion extending completely around the valve stem at the discharge side of the second portion thereof, said actuating portion extending from said inwardly curved portion and being substantially smaller than the discharge bore of said valve body with said curved portion merging smoothly into said actuating portion, and means exterior of the valve body for moving said valve stem to position the curved portion and the first and second portions thereof in the inlet side of said lubricant passage and out of engagement with the valve seat.

3. A valve for high pressure lubricant comprising a valve body, a passage for lubricant in the valve body, a valve seat formed in said valve body and dividing said lubricant passage into inlet and discharge sides, walls forming a bore within the valve body on the discharge side of said seat, a valve stem having at least a portion thereof within the valve body, said valve stem including a first portion adapted to engage with said seat to provide a fluid tight joint and to disengage from said seat to permit the passage of lubricant, a second portion inwardly and axially curved and extending completely around the valve stem and disposed in the discharge side of said passage when the valve is closed and at least partially disposed above the valve seat in the inlet side of said passage when the valve is open, and a groove surrounding said stem between said first and second portions.

FRANK J. FERRUZZI.

REFERENCES CITED

The following references are of record in the file of this patent:

UNITED STATES PATENTS

| Number | Name | Date |
| --- | --- | --- |
| 806,309 | White | Dec. 5, 1905 |
| 1,020,076 | Bowser | Mar. 12, 1912 |
| 1,252,940 | Osborne | Jan. 8, 1918 |
| 1,607,363 | Prescott | Nov. 16, 1926 |
| 1,820,772 | Blake | Aug. 25, 1931 |
| 2,067,445 | Ginter | Jan. 12, 1937 |
| 2,254,472 | Dahl | Sept. 2, 1941 |

FOREIGN PATENTS

| Number | Country | Date |
| --- | --- | --- |
| 227,669 | Switzerland | of 1943 |
| 281,488 | Italy | of 1931 |